(12) United States Patent
Anderson et al.

(10) Patent No.: US 7,882,696 B2
(45) Date of Patent: Feb. 8, 2011

(54) INTEGRATED SUPPORT AND MIXER FOR TURBO MACHINERY

(75) Inventors: Morris G. Anderson, Mesa, AZ (US); David K. Jan, Fountain Hills, AZ (US); George E. Zurmehly, Phoenix, AZ (US); Steve H. Halfmann, Chandler, AZ (US); Christopher E. Zollars, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 894 days.

(21) Appl. No.: 11/770,262

(22) Filed: Jun. 28, 2007

(65) Prior Publication Data

US 2009/0000304 A1 Jan. 1, 2009

(51) Int. Cl.
 *F02K 1/38* (2006.01)
(52) U.S. Cl. ............... 60/262; 60/770; 60/39.5; 181/220
(58) Field of Classification Search ............ 181/213, 181/220; 60/262, 264, 770, 771, 39.5; 239/265.17; 415/110, 173.1
 See application file for complete search history.

(56) References Cited

U.S. PATENT DOCUMENTS

| | | | | |
|---|---|---|---|---|
| 2,944,624 A | * | 7/1960 | Morley | 181/220 |
| 3,053,340 A | * | 9/1962 | Kutney | 181/220 |
| 3,084,505 A | * | 4/1963 | Cherchi | 239/265.11 |
| 3,092,205 A | * | 6/1963 | Urmston et al. | 181/213 |
| 3,153,319 A | | 10/1964 | Young et al. | |
| 3,685,612 A | * | 8/1972 | Bertin | 181/213 |
| 3,710,890 A | | 1/1973 | True et al. | |
| 3,927,522 A | * | 12/1975 | Bryce et al. | 60/264 |
| 4,003,249 A | | 1/1977 | Laskody | |
| 4,045,957 A | | 9/1977 | Disabato | |
| 4,050,631 A | * | 9/1977 | Syltebo | 239/265.25 |
| 4,066,214 A | | 1/1978 | Johnson | |
| 4,077,206 A | * | 3/1978 | Ayyagari | 60/262 |
| 4,117,671 A | | 10/1978 | Neal et al. | |
| 4,149,375 A | * | 4/1979 | Wynosky et al. | 60/262 |
| 4,227,370 A | | 10/1980 | Kirker | |
| 4,254,620 A | * | 3/1981 | Wright et al. | 60/263 |
| 4,292,803 A | | 10/1981 | Prior | |
| 4,401,269 A | | 8/1983 | Eiler | |
| 4,487,017 A | | 12/1984 | Rodgers | |
| 4,543,784 A | | 10/1985 | Kirker | |
| 4,548,034 A | | 10/1985 | Maguire | |
| 4,576,002 A | | 3/1986 | Mavrocostas | |
| 4,686,826 A | | 8/1987 | Koshoffer et al. | |
| 4,696,159 A | | 9/1987 | Horgan | |
| 4,754,924 A | * | 7/1988 | Shannon | 239/127.3 |
| 4,813,230 A | * | 3/1989 | Braithwaite | 60/262 |
| 4,909,346 A | | 3/1990 | Torkelson | |

(Continued)

*Primary Examiner*—William H Rodríguez
(74) *Attorney, Agent, or Firm*—Ingrassia Fisher & Lorenz, P.C.

(57) ABSTRACT

A support and air mixer includes an inner annular member, an outer annular member shaped and positioned such that an annular air gap is formed between the inner annular member and the outer annular member, and a plurality of air mixing members, each air mixing member having a mixing passageway therethrough and each air mixing member having an inner portion connected to the inner annular member, an outer portion connected to the outer annular member, and first and second opposing side portions interconnecting the inner and outer portions and the inner and outer annular members such that the mixing passageway is in fluid communication with the annular air gap.

20 Claims, 9 Drawing Sheets

U.S. PATENT DOCUMENTS

| | | | |
|---|---|---|---|
| 5,127,602 A | 7/1992 | Batey et al. | |
| 5,265,807 A * | 11/1993 | Steckbeck et al. | 239/265.11 |
| 5,440,875 A | 8/1995 | Torkelson et al. | |
| 5,638,675 A | 6/1997 | Zysman et al. | |
| 5,722,233 A | 3/1998 | Nikkanen et al. | |
| 5,775,095 A * | 7/1998 | Zysman et al. | 60/204 |
| 5,884,472 A | 3/1999 | Presz, Jr. et al. | |
| 5,924,632 A | 7/1999 | Seiner et al. | |
| 6,012,281 A | 1/2000 | Hauser | |
| 6,179,608 B1 | 1/2001 | Kraemer et al. | |
| 6,233,920 B1 | 5/2001 | Presz, Jr. et al. | |
| 6,463,992 B1 | 10/2002 | Dowhan et al. | |
| 6,532,729 B2 | 3/2003 | Martens | |
| 6,606,854 B1 | 8/2003 | Siefker et al. | |
| 6,612,106 B2 | 9/2003 | Balzar | |
| 6,786,038 B2 | 9/2004 | Lair | |
| 7,384,609 B2 * | 6/2008 | Zauner | 422/168 |
| 7,389,635 B2 * | 6/2008 | Anderson et al. | 60/204 |
| 7,434,384 B2 * | 10/2008 | Lord et al. | 60/262 |
| 7,506,501 B2 * | 3/2009 | Anderson et al. | 60/262 |
| 7,677,026 B2 * | 3/2010 | Conete et al. | 60/262 |
| 2002/0088443 A1 | 7/2002 | Marthaler et al. | |
| 2003/0145578 A1 | 8/2003 | Oishi | |
| 2006/0112675 A1 | 6/2006 | Anderson et al. | |
| 2009/0145134 A1 * | 6/2009 | Vuillamy et al. | 60/770 |
| 2010/0199626 A1 * | 8/2010 | Harding et al. | 60/39.5 |

\* cited by examiner

INTEGRATED SUPPORT AND MIXER FOR TURBO MACHINERY

GOVERNMENT RIGHTS

This invention was made with Government support under contract number DAAH10-03-2-0007 awarded by the U.S. Army. The Government has certain rights in this invention.

TECHNICAL FIELD

The present invention generally relates to turbine engines, and more particularly relates to a bearing support and air mixer assembly for a turbine engine.

BACKGROUND

Various types of vehicles, such as jet airplanes and helicopters, utilize turbine engines as a primary power source for locomotion. Turbine engines may include a compressor section, in which inlet air is compressed, followed by a combustor section in which fuel is combusted with the compressed air to generate exhaust gas. The exhaust gas is then directed to a turbine section, where energy is extracted from the exhaust gas.

The compressor section and the turbine typically include multiple disks connected to a common bearing and/or shaft. Some turbine engines are configured such that a bearing support and/or aft frame must be provided to support the aft end of the bearing, while allowing for a substantially annular flow path for the exhaust.

The turbine exhaust may be mixed with air from a bypass stream of relatively cool, ambient air to improve power and reduce the amount of noise generated. This process is often facilitated with an air mixer that surrounds the bearing support. In order to provide structural support for the bearing, an aft frame with struts between the bearing support and engine outer case is typically used. These struts pass through the flow path for the exhaust, and although relatively small, the struts do significantly reduce engine power. Additionally, the limited size of the struts can adversely restrict the size of service lines (e.g., for oil, buffer air, etc.) to the turbo machinery within the bearing support.

Accordingly, it is desirable to provide a support and mixer assembly that reduces the need for the struts, while improving engine performance. Additionally, is it desirable to provide a support and mixer assembly that improves the service access to the turbo machinery in the bearing support. Furthermore, other desirable features and characteristics of the present invention will become apparent from the subsequent detailed description and the appended claims, taken in conjunction with the accompanying drawings and the foregoing technical field and background.

BRIEF SUMMARY

An integrated support and air mixer for turbo machinery is provided. The support and air mixer includes an inner annular member, an outer annular member shaped and positioned such that an annular air gap is formed between the inner annular member and the outer annular member, and a plurality of air mixing members, each air mixing member having a mixing passageway therethrough and each air mixing member having an inner portion connected to the inner annular member, an outer portion connected to the outer annular member, and first and second opposing side portions interconnecting the inner and outer portions and the inner and outer annular members such that the mixing passageway is in fluid communication with the annular air gap.

An integrated bearing support and air mixer for turbo machinery is provided. The support and air mixer includes a substantially circular inner annular member having a central axis, a substantially circular outer annular member concentric about the central axis and shaped and positioned such that an annular air gap is formed between the inner annular member and the outer annular member, a plurality of support members positioned around the inner annular member such that each pair of adjacent support members have an air separation gap therebetween in fluid communication with the annular air gap, the support members interconnecting the inner annular member and the outer annular member, and a plurality of air mixing pipes, each air mixing pipe having an air mixing passageway therethrough and each having an inner portion connected to the inner annular member, an outer portion connected to the outer annular member, and first and second opposing side portions connected to respective adjacent support members such that the air mixing passageway is in fluid communication with the annular air gap through the respective air separation gap between the respective adjacent support members.

According to another embodiment, a turbo engine is provided. The turbine engine includes a casing, a bearing extending through the casing, a plurality of disks connected to the bearing, and an integrated bearing support and air mixer supporting an end of the bearing. The integrated bearing support and air mixer includes a substantially circular inner annular member having a central axis, a substantially circular outer annular member concentric about the central axis and shaped and positioned such that an annular air gap is formed between the inner annular member and the outer annular member, a plurality of support members positioned around the inner annular member such that each pair of adjacent support members have an air separation gap therebetween in fluid communication with the annular air gap, the support members interconnecting the inner annular member and the outer annular member, and a plurality of air mixing pipes, each air mixing pipe having an air mixing passageway therethrough and each having an inner portion connected to the inner annular member, an outer portion connected to the outer annular member, and first and second opposing side portions connected to respective adjacent support members such that the air mixing passageway is in fluid communication with the annular air gap through the respective air separation gap between the respective adjacent support members.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-9 are merely illustrative and may not be drawn to scale.

FIG. 1 to FIG. 9 illustrate an integrated support and air mixer for turbo machinery. The support and air mixer includes an inner annular member, an outer annular member shaped and positioned such that an annular air gap is formed between the inner annular member and the outer annular member, and a plurality of air mixing members, each having a mixing passageway therethrough and each having an inner portion connected to the inner annular member, an outer portion connected to the outer annular member, and first and second opposing side portions interconnecting the inner and outer portions and the inner and outer annular members such that the mixing passageway is in fluid communication with the annular air gap.

Figure 1:
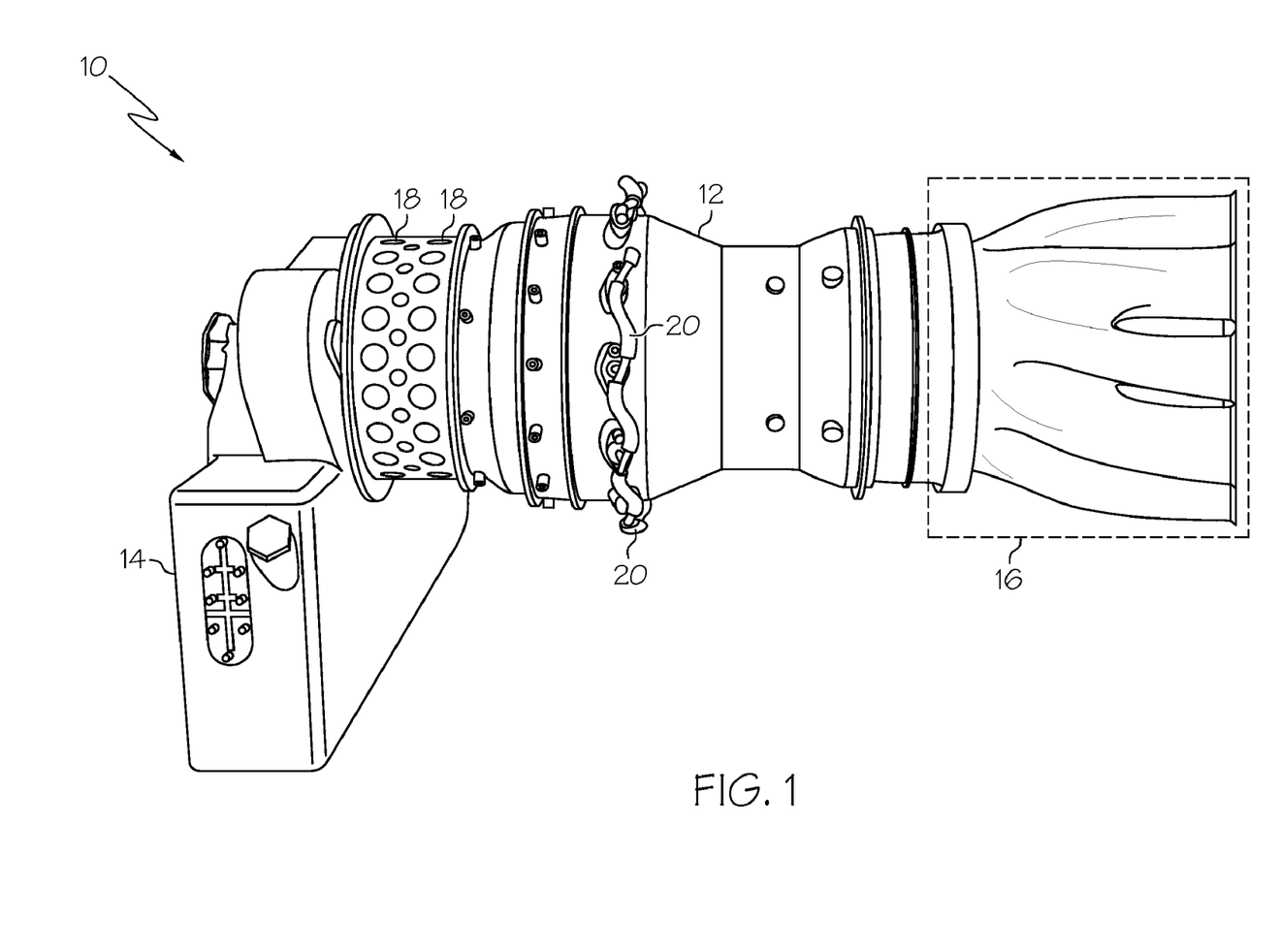
FIG. 1 is an isometric view of a turbine engine, according to one embodiment of the present invention.
Figure 2:
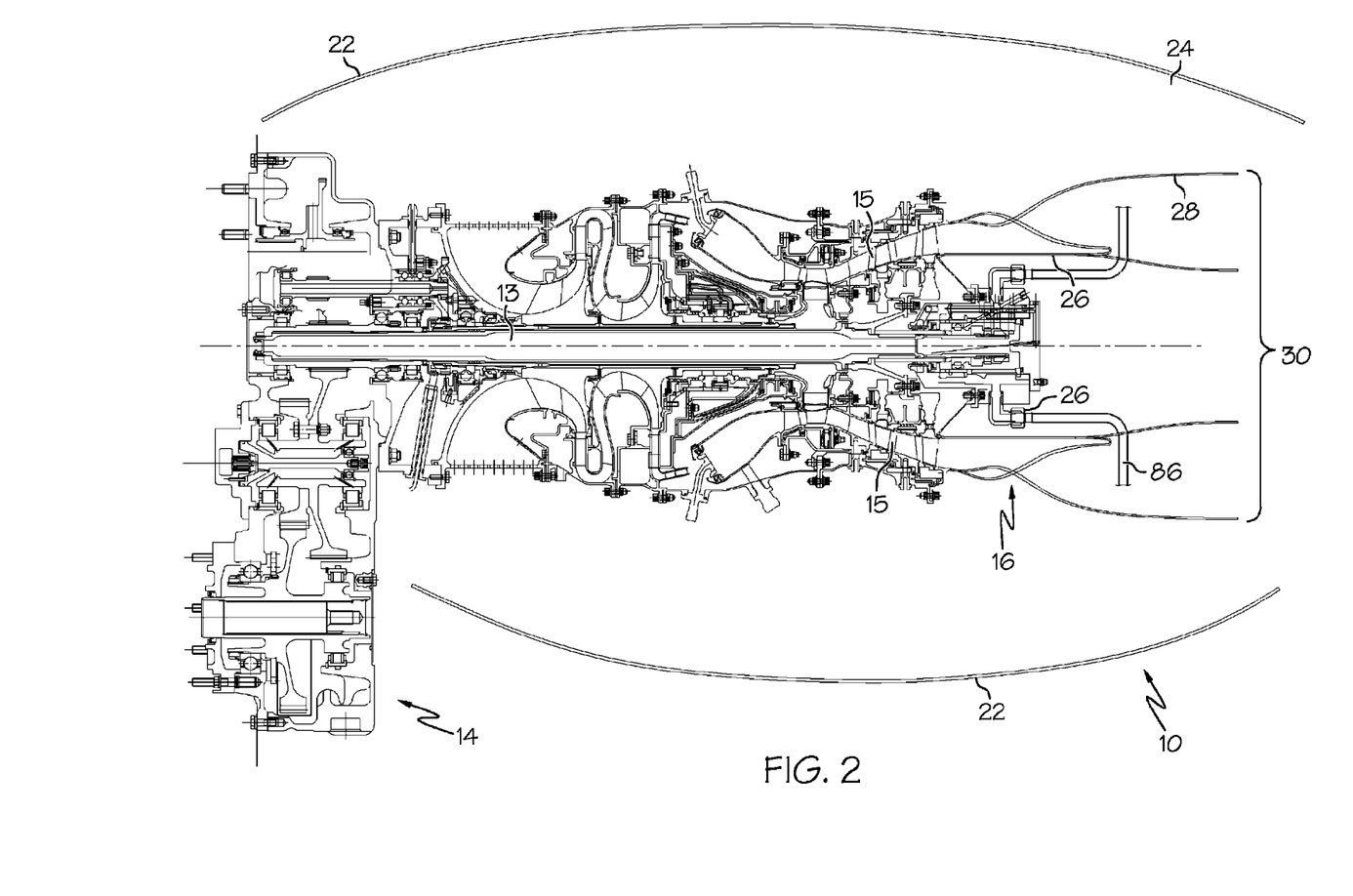
FIG. 2 is a cross-sectional view of the turbine engine of FIG. 1.

FIGS. 1 and 2 illustrate a turbine engine 10, according to one embodiment of the present invention. In the depicted embodiment, the turbine engine is a "turboshaft" and includes a turbo machinery casing 12, a gear box 14, and support/mixer assembly 16. The casing 12 has a substantially cylindrical shape and covers various turbo machinery components, such as a shaft 13 and various disks 15 (e.g., compressors and turbines) connected to the shaft 13, as shown in FIG. 2 and as commonly understood in the art. The casing 12 includes air intake openings 18 in a forward portion thereof and multiple fuel lines 20 extending into a central portion thereof to the turbo machinery therein. The shaft 13 is connected to a forward end of the casing 12 (and the gear box 14), and the support/mixer assembly 16 is connected to an aft end of the casing 12. Referring specifically to FIG. 2, the turbine engine 10 also includes a housing (or outer casing) 22 enclosing the casing 12 and the support/mixer assembly 16 and partially enclosing the gear box 14. An outer flow path 24 may be defined between the support/mixer assembly 16 and the housing 22, as will be described in greater detail below.

The support/mixer assembly 16 is connected to the casing 12 at an aft end thereof and includes a bearing support (and/or aft frame) 26 and an exhaust mixer 28 that are combined into an integrated bearing support and air mixer 30 (or simply "support/mixer 30"), as shown in greater detail in FIGS. 3-6.

Referring now to FIGS. 3-8, the support/mixer 30 includes an inner annular member (or hub) 32, an outer annular member (or shroud) 34, and air mixing members (or pipes) 36. The inner annular member 32 is substantially circular with a bearing opening 38 therethrough, is substantially symmetric about a central axis 40, and has a forward (or first) end 42 and an aft (or second) end 44.

The outer annular member 34 is substantially circular with a hub opening 46 therethrough, is concentric with the inner annular member 32 about the central axis 40, and has a forward (or first) end 48 and an aft (or second) end 50. The outer annular member 34 includes a series of lobes 52 and troughs 54 formed thereon near the second end 50 thereof. Each lobe 52 has an outer portion 56, first and second opposing side portions 58, and a lobe passageway 60 extending therethrough, which is formed between the respective lobe 52 and the inner annular member 32. The lobes 52 are separated by the troughs 54 such that a distance lies between outer surfaces of respective first and second side portions 58 of each pair of adjacent lobes 52, and although not specifically illustrated, the lobes 52 each have a width as measured between the side portions 58 thereof at the second end 50 of the outer annular member 34. An annular air gap 62 is formed between the inner annular member 32 and the outer annular member 34 and between the first ends 42 and 48 of the annular members 32 and 34 and the lobes 52. The annular air gap 62 is connected to, or in fluid communication with, the lobe passageways 60.

Figure 5:
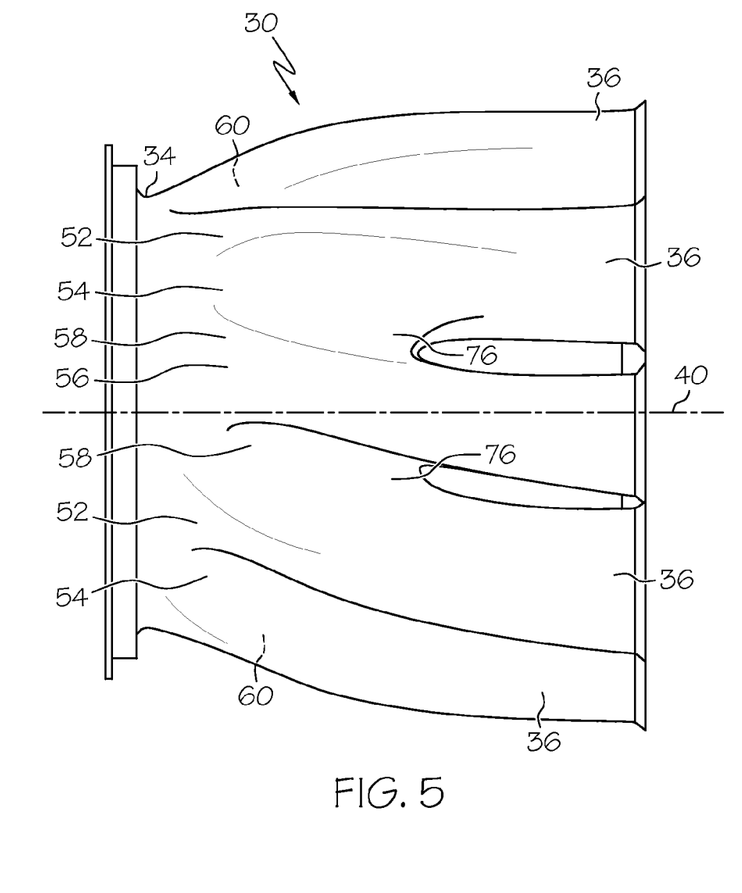
FIG. 5 is a side view of the integrated support and air mixer of FIG. 3.

The air mixing members 36 are connected to the inner and outer annular members 32 and 34 and aligned with the lobes 52 such that the air mixing passageways 70 are in fluid communication with the annular air gap 62 through the lobe passageways 60. Each air mixing member 36 includes an inner portion 64, an outer portion 66, and first and second opposing side portions 68 and has an air mixing passageway 70 therethrough. The inner portions 64 of the air mixing members 36 are connected to the inner annular member 32, the outer portions 66 of the air mixing members 36 are connected to the outer portions 56 of the lobes 52 on the outer annular member 34, and the side portions 68 of the air mixing members 36 are connected to the side portions 58 of the lobes 52. The air mixing members 36 are shaped such that the air mixing passageways 70 extend in a direction that is substantially parallel with the central axis 40. That is, as is evident in FIGS. 6 and 7, lines may be extended through the air mixing passageways 70, through the lobe passageways 60, and into the annular air gap 62. However, as shown in FIG. 5, the side portions 68 of the air mixing members 36 (and/or the side portions 58 of the lobes 52) are curved such that the air mixing members 36 (and/or the lobes 52) bend in a counterclockwise direction (as viewed in FIG. 6) as the air mixing members 36 (and/or the lobes 52) extend away from the annular air gap 62. This curvature results in an overall "twist" of the channels defined by the lobe passageways 60 and the air mixing passageways 70. The degree of twist may vary depending upon the amount of turbine exit swirl as well as the dimensions of the engine itself. In one illustrative example the degree of twist may be not greater than about 60°. In another illustrative example, the degree of twist may be from about 10° to about 30°.

The air mixing members 36 have a width, as measured between the side portions 68, that is approximately the same as the widths of the lobes 52, and a height, as measured between the inner and outer 64 and 66 portions thereof. In one embodiment, the height of the air mixing members 36 is greater than the width of the air mixing members 36. The width of the air mixing members 36, in combination with the spacing of the lobes 52, causes air mixing gaps 72 to be formed between the respective first and second side portions 68 of each pair of adjacent air mixing members 36. The height of the air mixing members 36, in combination with the diameter of the inner annular member 32, causes a bearing air gap (or sump area) 74 to be formed about the central axis 40 between the air mixing members 36 on opposing sides of the central axis 40.

The support/mixer 30 also includes support members 76 that interconnect the inner annular member 32, the outer annular member 34, and the air mixing members 36. The support members 76 may form part of the troughs 54 of the outer annular member 34, and as such, may at least partially interconnect the respective side portions 58 of the lobes 52. As shown most clearly in FIG. 8, the inner and outer annular members 32 and 34 may be directly interconnected by the support members 76, as well as be within closest proximity, at (and/or only at) the second ends 44 and 50 thereof. Because of the shaped and/or height of the support members 76 air separation gaps, or slots, 78 are formed between the support members 76 (and/or the second end 50 of the outer annular member 34) and the second end 44 of the inner annular member 32. Although not specifically illustrated, the air separation gaps 78 have a length, as measured in a direction parallel to the central axis 40, and a height, as measured between the support members 76 (and/or the troughs 54). In one embodiment, the length of the air separation gaps 78 is at least twice their height.

Figure 3:
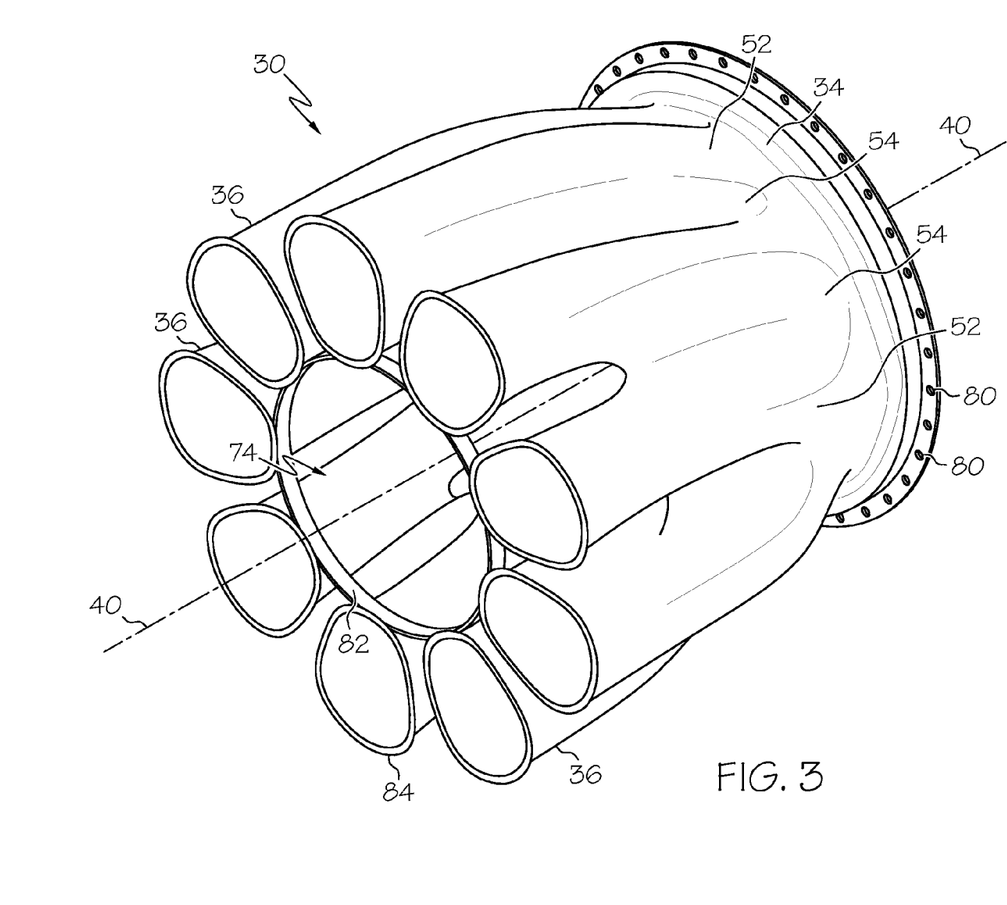
FIG. 3 is an isometric view of a first end of an integrated support and air mixer within the turbine engine of FIG. 1.
Figure 4:
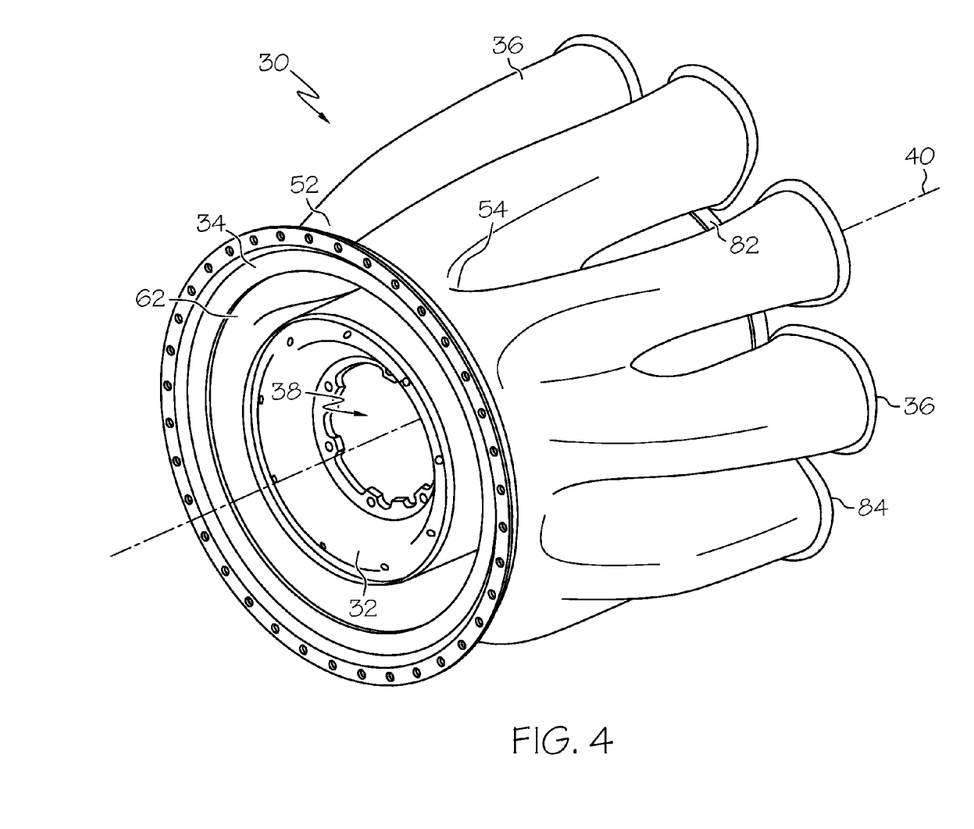
FIG. 4 is an isometric view of a second end of the integrated support and air mixer of FIG. 3.
Figure 6:
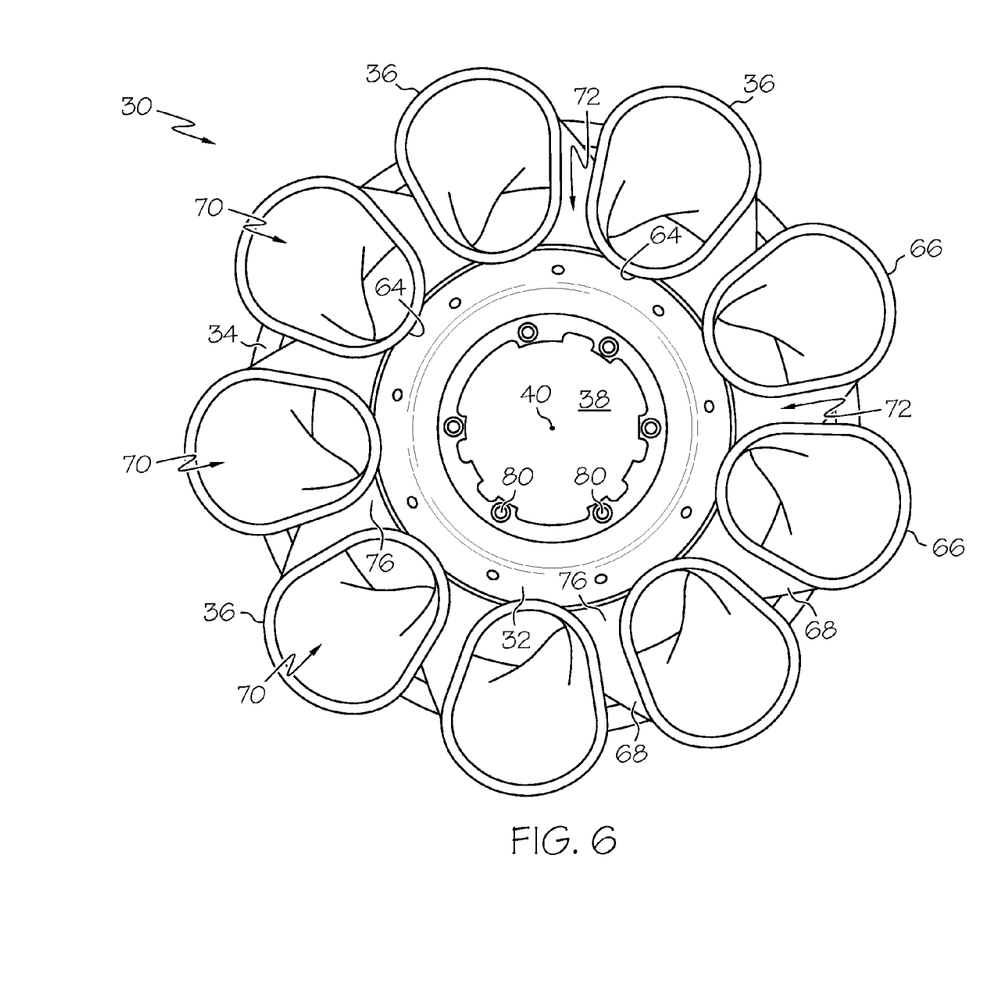
FIG. 6 is a view of the first end of the integrated support and air mixer of FIG. 3 along a central axis thereof.
Figure 7:
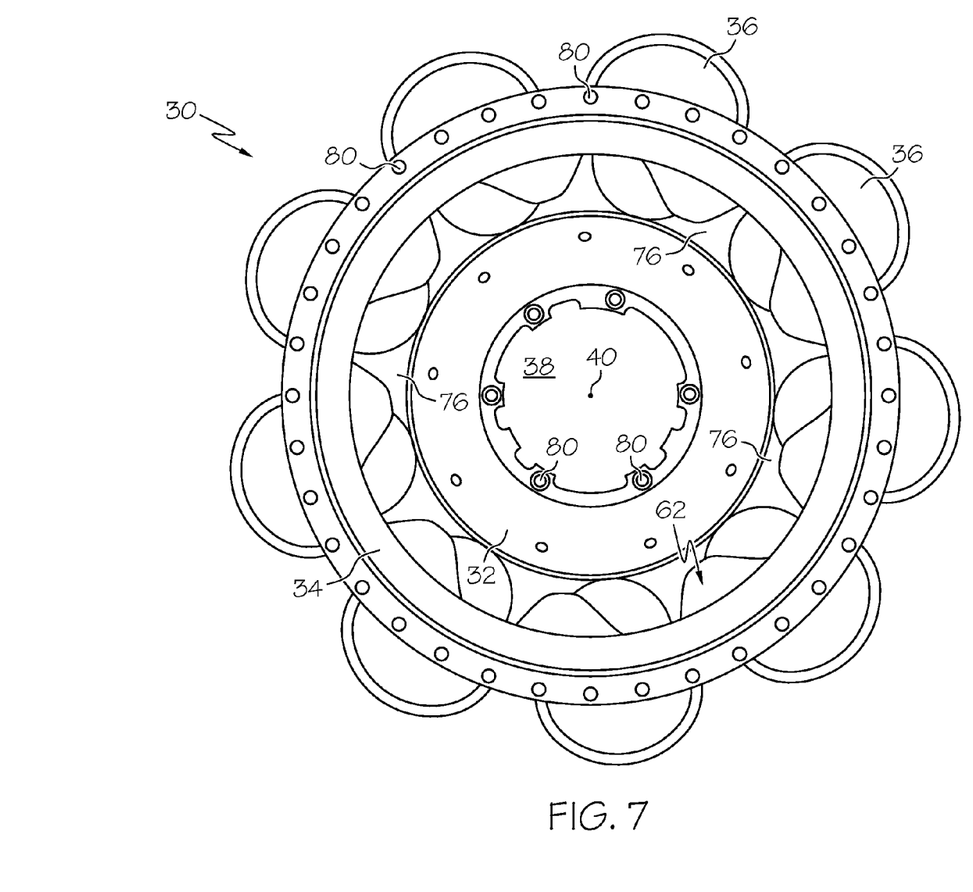
FIG. 7 is a view of the second end of the integrated support and air mixer of FIG. 3 along the central axis thereof.

Referring to FIGS. 3, 6, and 7, the support/mixer 30 also includes, in the depicted embodiment, multiple bolt hole flanges 80 on an inner edge at the first end 42 of the inner annular member 32 and on an outer edge of the first end 48 of the outer annular member 34. As clearly shown in FIG. 3, the depicted embodiment also includes a support ring 82 within the bearing air gap 74 connected to flares 84 on the inner portions 64 of the air mixing members 36 at the ends thereof opposing the inner and outer annular members 32 and 34 to provide additional mechanical support for the air mixing members 36. The support/mixer 30, including the inner and outer annular members 32 and 34, the air mixing members 36, and the support members 76 may be made of a single, integral piece of metal, which is formed, for example, by casting. The support/mixer 30 may be made of various heat resistant metals, such as titanium or a nickel-based alloy (e.g., in a nickel-chromium matrix). The various components described above may have thicknesses between, for example, 0.04 and 0.08 inches. However, this thickness may be increased at various portions of the support/mixer 30 to improve structural integrity, as will be appreciated by one skilled in the art.

Figure 8:
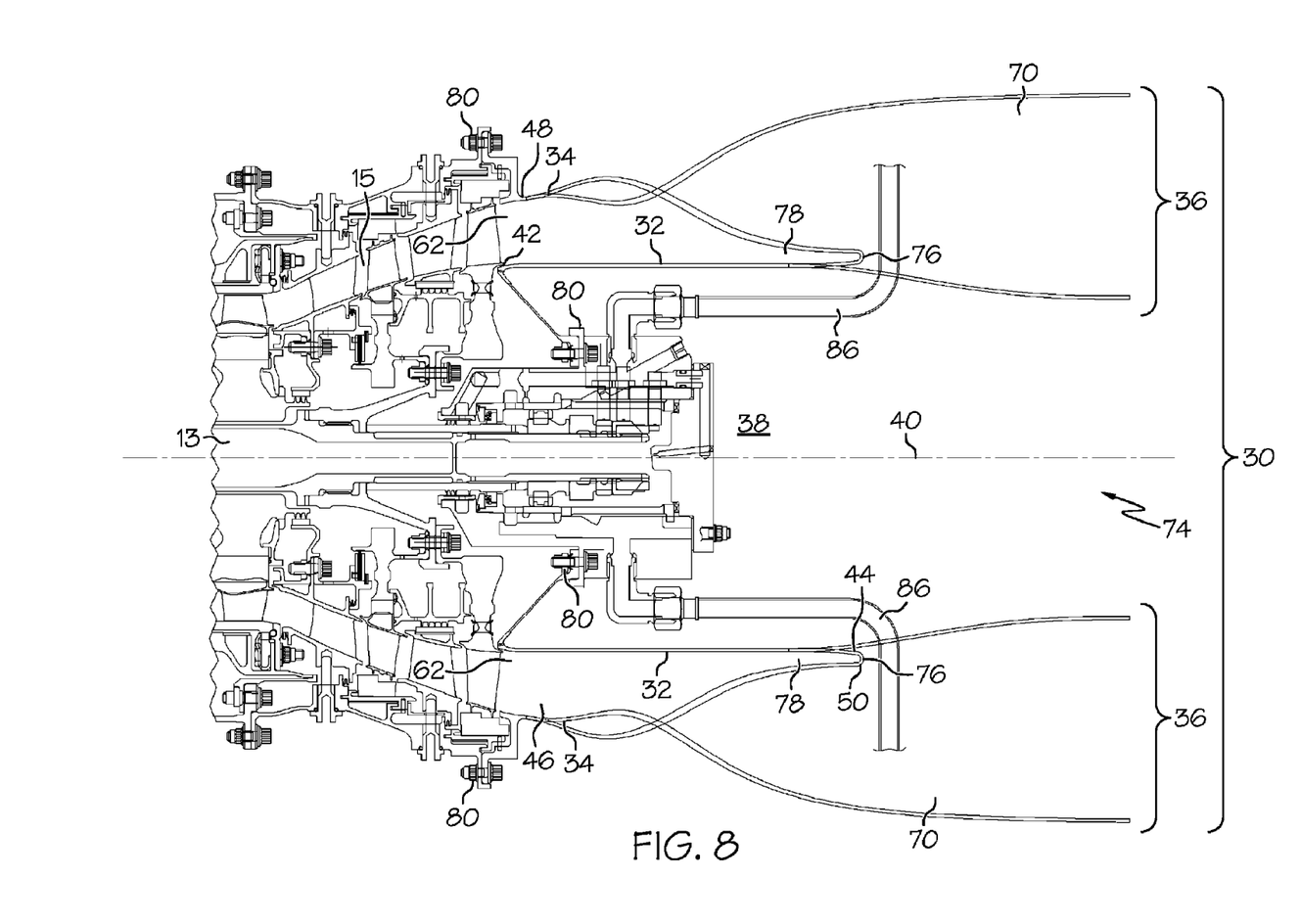
FIG. 8 is a cross-sectional view of an aft portion of the turbine engine of FIG. 1.
Figure 9:
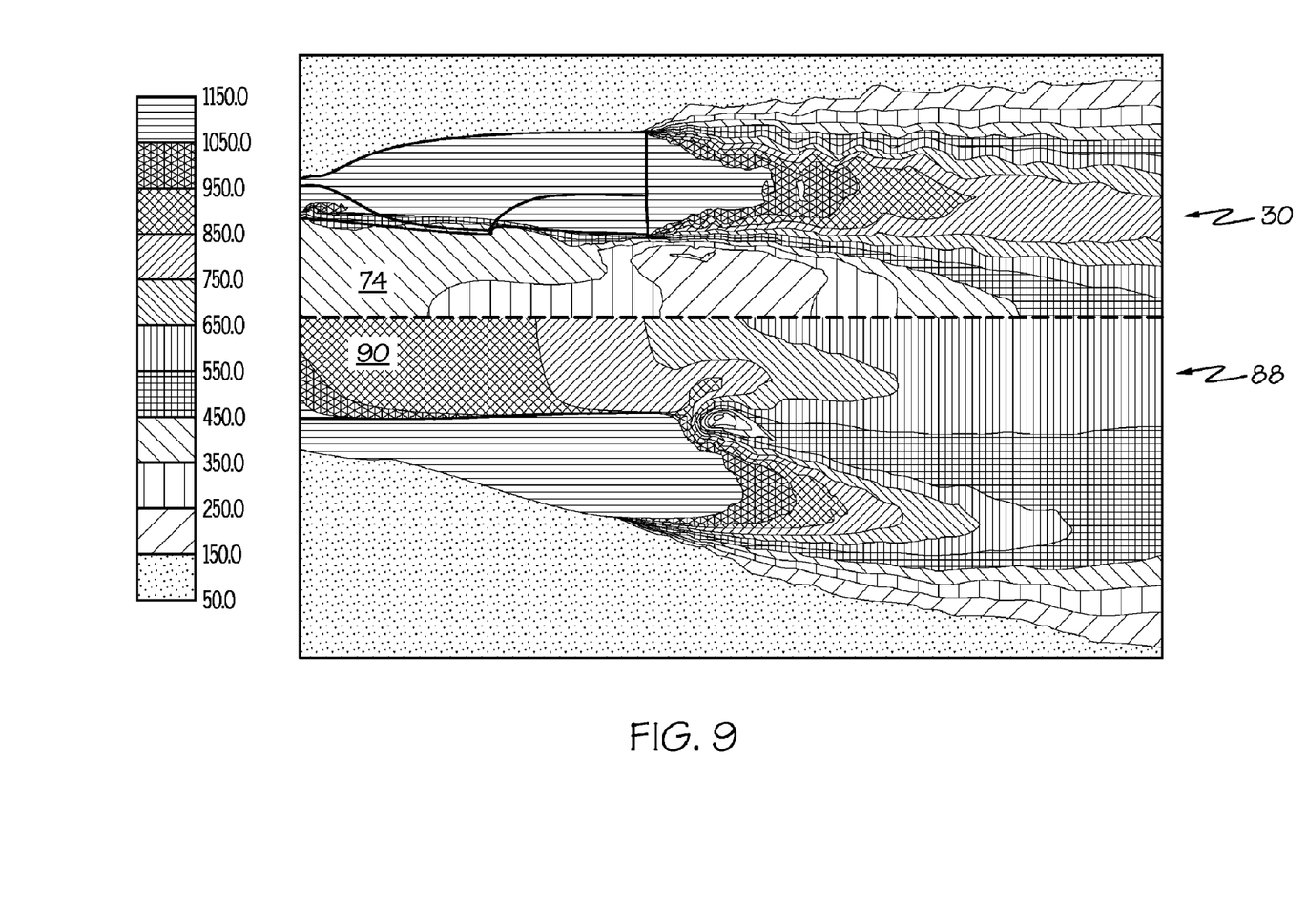
FIG. 9 is a temperature indexed illustration comparing operating temperatures of the integrated support and air mixer of FIG. 3 to those of a conventional bearing support and air mixer.

Referring to FIGS. 2 and 8, after the support/mixer 30 is installed into the jet engine using, for example, the bolt hole flanges 80, the shaft 13 (and/or a bearing assembly) of the turbine engine 10 extends into the bearing opening 38 of the inner annular member 32, while the disks 15 are aligned with the annular air gap 62. In one embodiment, no covering component is placed over the bearing opening 38 so that the shaft 13 (and/or the bearing assembly) is exposed through the bearing air gap 74. The inner annular member 32 thus supports the shaft 13, and the outer annular member 34 supports the inner annular member 32 through the support members 76. Various service lines 86 (e.g., lubricant and coolant lines) may be fed to the turbo machinery through the air mixing gaps 72 between the air mixing members 36 and the bearing air gap 74.

During operation, referring to FIGS. 1, 2, and 8, air is drawn into the casing 12 through the air intake openings 18 that leads into the compressor section of the engine. During operation, air is drawn into the engine, compressed, mixed with fuel, and ignited. The ignited mixture burns producing hot gas that expands through the turbines to produce power. Part of the energy extracted from the gas by the turbines is used to drive the engine compressor section. The remaining power is extracted from the turbines through the gearbox to power a vehicle, such as a helicopter. The inner annular member 32 is used to support the shaft 13 connected to the turbine. As the shaft 13 is coupled to the gear box 14, it may be used to drive various other loads within the vehicle, such as generators and/or pumps.

Exhaust from the turbine is sent into the annular air gap 62 of the support/mixer 30. The exhaust flows from the annular air gap 62 into the lobe passageways 60 and the air separation gaps 78. The exhaust that enters the air separation gaps 78 is split into the two adjacent air mixing members 36 by the support members 76, while the remainder of the exhaust flows directly into the air mixing passageways 70. The curvature in the sides of the air mixing members 36 and/or the lobes 52 facilitates the removal of the rotational component (swirl) of the air left over from the turbine. At the same time, while the vehicle is in motion, ambient air outside of the casing 12 is forced through the outer flow path 24 (FIG. 1). The ambient air passes through the troughs 54 and between the air mixing members 36. After passing the ends of the air mixing members 36, the exhaust and the ambient air mix, as will be appreciated by one skilled in the art. Additionally, some of the ambient air passes through the air mixing gaps 72 into the aft bearing support area for cooling.

One advantage of the support/mixer assembly described above is that because the bearing support and air mixer are integrated into a single, integral component, the number of parts required to construct the turbine engine is reduced. Another advantage is that the mixing of the exhaust with the ambient air is improved, along with gas pressure recovery performance, resulting in increased power, improved efficiency, and reduced noise, as well as allowing an overall reduction in the length of the assembly. Additionally, because no struts are needed to be placed within the path of the exhaust, performance is even further improved. Another advantage is that because of the gaps between the air mixing members, service lines may be fed into the turbo machinery without disrupting the flow of the exhaust. The air gaps between the air mixing members also increase the flow of ambient air to the bearing air gap, thus improving the cooling of the bearing assembly. FIG. 7 is illustrates the results of a computer modeling comparison of the cooling provided by the support/mixer 30 according to one embodiment of the present invention and the cooling provided by a conventional bearing support and air mixer assembly 88. As indicated, the operating temperatures within the bearing sump area 74 of the support/mixer 30 may be as much as 500° F. lower than those of the bearing sump area 90 of the conventional assembly 88.

Other embodiments may utilize configurations of turbo machinery other than the turboshaft turbine engine shown in FIG. 1, such as auxiliary power units, turboshafts, turbojets, turboprops, and turbofans, which may be installed in various types of vehicles, such as ground vehicles, helicopters, and jet and propeller airplanes. While the support/mixer assembly shown in FIGS. 3-5 has nine lobes and troughs, it should be understood that any number of lobes or troughs, depending upon the amount of mixing and pressure recovery desired from a gas turbine engine may be used. The degree of twist may also be dependent on the turbine exit swirl. It will also be appreciated that the exact dimensions and shapes of the inner annular member, the outer annular member, and the air mixing pipes may be designed to work in concert to provide optimal cooling and thrust and may be determined empirically using computational fluid dynamics (CFD) codes. CFD codes are well known in the art and can either be commercially obtained or written by the skilled artisan to use to determine the dimensions. Non-limiting examples of commercial CFD codes that may be used with the present invention are FLUENT, CFX, or STAR-CD. Using the CFD codes the skilled artisan may determine the dimensions required to give optimal cooling and pressure recovery in the desired application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An integrated support and air mixer for turbo machinery comprising:
    an inner annular member;
    an outer annular member shaped and positioned such that an annular air gap is formed between the inner annular member and the outer annular member; and
    a plurality of air mixing members, each air mixing member having a mixing passageway therethrough and each air mixing member having an inner portion connected to the inner annular member, an outer portion connected to the outer annular member, and first and second opposing side portions interconnecting the inner and outer portions and the inner and outer annular members such that the mixing passageway is in fluid communication with the annular air gap.

2. The integrated support and air mixer of claim 1, wherein at least one of the inner and outer annular members comprises a plurality of lobes, each lobe having a lobe passageway therethrough interconnecting the annular air gap and the mixing passageway of a respective mixing member.

3. The integrated support and air mixer of claim 2, wherein the outer annular member comprises the plurality of lobes and each lobe comprises an outer portion connected to the outer portion of the respective air mixing member and first and second opposing side portions connected to the respective first and second side portions of the respective air mixing member, and further comprising a plurality of support members interconnecting the respective first and second side portions of adjacent lobes.

4. The integrated support and air mixer of claim 3, wherein the inner and outer annular members each have first and second opposing ends, and the outer portion and the first and second side portions of each lobe comprise inner and outer sides, the inner sides being adjacent to the lobe passageways and the outer sides opposing the lobe passageways, and wherein the lobes are spaced such that there is a distance between the outer sides of the first and second side portions of each pair of adjacent lobes.

5. The integrated support and air mixer of claim 4, wherein the support members are shaped such that an air separation gap lies between each support member and the inner annular member.

6. The integrated support and air mixer of claim 5, wherein each air separation gap has a length and a height, the length being at least twice the height.

7. The integrated support and air mixer of claim 6, wherein the support members further interconnect the inner annular member and the outer annular member substantially only at the second ends thereof.

8. The integrated support and air mixer of claim 7, wherein the inner and outer annular members are concentric about a central axis and a line extending through each air mixing member and the respective lobe of the outer annular member and into the annular air gap is substantially parallel to the central axis.

9. The integrated support and air mixer of claim 8, wherein the lobes have a lobe width, as measured between the first and second opposing side portions thereof at the second end of the outer annular member, and the air mixing members have an air mixing member width being approximately the same as the lobe width, and wherein an air mixing member gap lies between the first and second side portions of each pair of adjacent air mixing members, and wherein the air mixing members each have a height, as measured between the inner and outer portion thereof, such that a bearing air gap lies about the central axis between the air mixing members on one side of the central axis and the air mixing members on an opposing side of the central axis.

10. The integrated support and air mixer of claim 9, wherein the first and second side portions of at least one of the lobes of the outer annular member and the air mixing members are curved, and further comprising a support ring interconnected the air mixing members.

11. An integrated bearing support and air mixer for turbo machinery comprising:
    a substantially circular inner annular member having a central axis;
    a substantially circular outer annular member concentric about the central axis and shaped and positioned such that an annular air gap is formed between the inner annular member and the outer annular member;
    a plurality of support members positioned around the inner annular member such that each pair of adjacent support members have an air separation gap therebetween in fluid communication with the annular air gap, the support members interconnecting the inner annular member and the outer annular member; and
    a plurality of air mixing pipes, each air mixing pipe having an air mixing passageway therethrough and each having an inner portion connected to the inner annular member, an outer portion connected to the outer annular member, and first and second opposing side portions connected to respective adjacent support members such that the air mixing passageway is in fluid communication with the annular air gap through the respective air separation gap between the respective adjacent support members.

12. The integrated bearing support and air mixer for turbomachinery of claim 11, wherein the inner and outer annular members have first and second opposing ends, the air mixing pipes are connected to the second ends of the inner and outer annular members, and the support members further interconnect the inner and outer annular members at the second at the second ends thereof.

13. The integrated bearing support and air mixer for turbomachinery of claim 12, wherein the inner and outer annular members are only directly interconnected by the support members at the second ends thereof and each air separation gap has a length and a height, the length being at least twice the height.

14. The integrated support and air mixer of claim 13, wherein the outer annular member comprises a plurality of lobes, each lobe having a lobe passageway therethrough and comprising first and second opposing side portions being connected to respective adjacent support members and the respective first and second side portions of the respective air mixing pipe connected to the respective adjacent support members and an outer portion connected to the outer portion of the respective air mixing pipe.

15. The integrated bearing support and air mixer of claim 14, wherein the lobes have a lobe width, as measured between the first and second opposing side portions thereof at the second end of the outer annular member, the air mixing pipes have an air mixing pipe width being approximately the same as the lobe width, an air mixing pipe gap lies between the first and second side portions of each pair of adjacent air mixing pipes, and wherein the air mixing members each have a height, as measured between the inner and outer portion thereof, such that a bearing air gap lies about the central axis between the air mixing pipes on one side of the central axis and the air mixing pipes on an opposing side of the central axis, and wherein in each air mixing pipe, the air mixing pipe height is greater than the air mixing pipe width.

16. A turbine engine comprising:
   a casing;
   a bearing extending through the casing;
   a plurality of disks connected to the bearing; and
   an integrated bearing support and air mixer supporting an end of the bearing, the integrated bearing support and air mixer comprising:
      a substantially circular inner annular member having a central axis;
         a substantially circular outer annular member concentric about the central axis and shaped and positioned such that an annular air gap is formed between the inner annular member and the outer annular member;
      a plurality of support members positioned around the inner annular member such that each pair of adjacent support members have an air separation gap therebetween in fluid communication with the annular air gap, the support members interconnecting the inner annular member and the outer annular member; and
      a plurality of air mixing pipes, each air mixing pipe having an air mixing passageway therethrough and each having an inner portion connected to the inner annular member, an outer portion connected to the outer annular member, and first and second opposing side portions connected to respective adjacent support members such that the air mixing passageway is in fluid communication with the annular air gap through the respective air separation gap between the respective adjacent support members.

17. The turbine engine of claim 16, wherein the inner and outer annular members have first and second opposing ends, the air mixing pipes are connected to the second ends of the inner and outer annular members, and the support members further interconnect the inner and outer annular members at the second at the second ends thereof.

18. The turbine engine of claim 17, wherein the outer annular member comprises a plurality of lobes, each lobe having a lobe passageway therethrough and comprising first and second opposing side portions being connected to respective adjacent support members and the respective first and second side portions of the respective air mixing pipe connected to the respective adjacent support members and an outer portion connected to the outer portion of the respective air mixing pipe.

19. The turbine engine of claim 18, wherein the lobes have a lobe width, as measured between the first and second opposing side portions thereof at the second end of the outer annular member, the air mixing pipes have an air mixing pipe width being approximately the same as the lobe width, an air mixing pipe gap lies between the first and second side portions of each pair of adjacent air mixing pipes, and wherein the air mixing members each have a height, as measured between the inner and outer portion thereof, such that a bearing air gap lies about the central axis between the air mixing pipes on one side of the central axis and the air mixing pipes on an opposing side of the central axis, and wherein in each air mixing pipe, the air mixing pipe height is greater than the air mixing pipe width.

20. The turbine engine of claim 19, further comprising at least one fluid line extending through at least one of the air mixing pipe gaps.

* * * * *